FREE POINT INDICATOR APPARATUS

Original Filed Oct. 12, 1964 4 Sheets-Sheet 1

Lawrence K. Moore
INVENTOR.

BY Hayden & Pravel

ATTORNEYS

FREE POINT INDICATOR APPARATUS

Original Filed Oct. 12, 1964 4 Sheets-Sheet 2

Lawrence K. Moore
INVENTOR.

BY Hayden & Pravel

ATTORNEYS

FREE POINT INDICATOR APPARATUS

Original Filed Oct. 12, 1964 4 Sheets-Sheet 3

Lawrence K Moore
INVENTOR

BY Hayden & Pravel

ATTORNEYS

FREE POINT INDICATOR APPARATUS

Original Filed Oct. 12, 1964 4 Sheets-Sheet 4

Lawrence K. Moore
INVENTOR.

BY Hayden & Pravel

ATTORNEYS

United States Patent Office

Re. 26,458
Reissued Sept. 17, 1968

26,458
FREE POINT INDICATOR APPARATUS

Lawrence K. Moore, 3716 Ingold St.,
Houston, Tex. 77005

Original No. 3,331,243, dated July 18, 1967, Ser. No. 403,118, Oct. 12, 1964. Application for reissue Aug. 25, 1967, Ser. No. 669,343
10 Claims. (Cl. 73—151)

Matter enclosed in heavy brackets [ ] appears in the original patent but forms no part of this reissue specification; matter printed in italics indicates the additions made by reissue.

This invention relates to new and useful improvements in free point indicator apparatus, and particularly a free point indicator apparatus which is lowered on and actuated by a non-electrical wire line.

In the drilling of wells, or in performing other well operations, the drill pipe, tubing or casing may become stuck at some point in the well, making it necessary to locate the free point above the stuck point so as to perform any one of the usual techniques for the recovery of the pipe. In the past, electrical indicating devices have been used in attempting to locate the stuck point and/or free point in a pipe which is stuck in a well. Such devices are expensive due to the special electrical equipment involved. Furthermore, since such special electrical equipment is used only for the free point indicator apparatus, it is not normally available at a well site, and therefore, it must be brought to each job when needed. The bulk of such equipment either necessitates the use of special trucks for housing it, or the time-consuming task of setting up the equipment at the well site must be undertaken.

It is an object of the present invention to provide a new and improved free point indicator apparatus for indicating the free point of a pipe which is stuck in a well.

An important object of this invention is to provide a new and improved free point indicator apparatus which is adapted to be lowered on and actuated by a non-electrical flexible line.

Another object of this invention is to provide a new and improved free point indicator apparatus which is actuatable by a non-electrical wire line and which is capable of indicating longitudinal stretch and torque in a pipe so as to adequately inform the operator of the condition of the pipe at the free point.

A particular object of the present invention is to provide a new and improved free point indicator apparatus wherein the location of the free point in a stuck pipe is determined by a mechanical means using a tapered measuring or control rod in combination with one or more variable opening mechanisms so as to obtain an indication of the condition of the pipe when longitudinal stretch and/or torque forces are applied to the stuck pipe.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
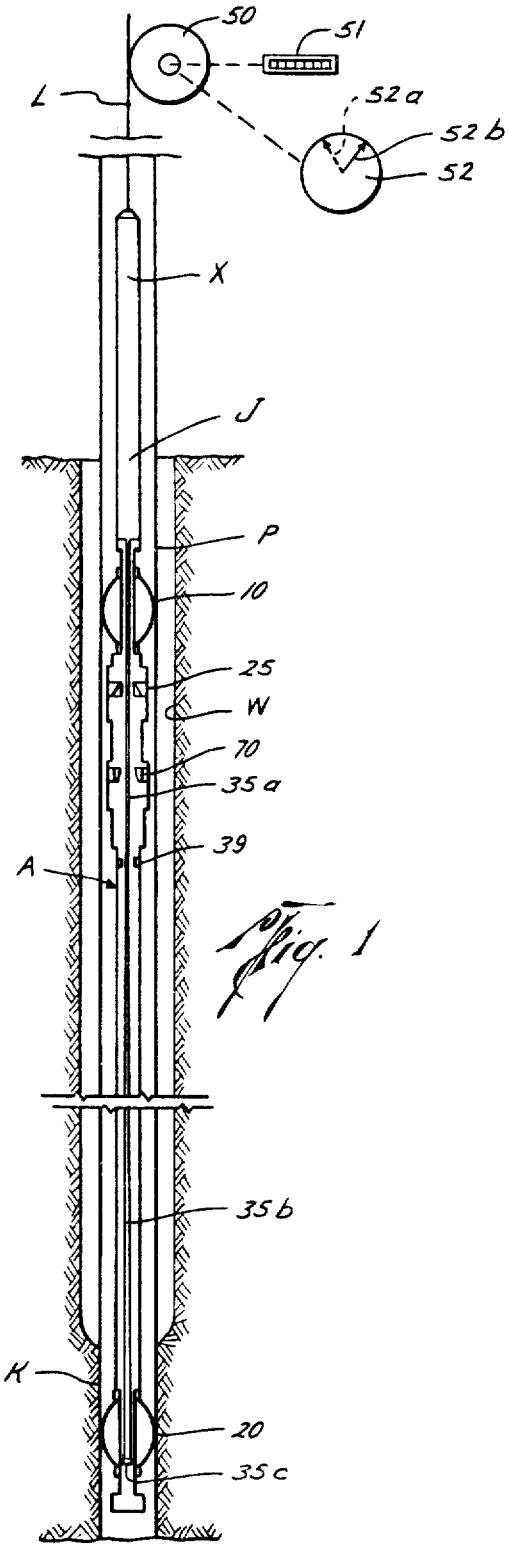
FIG. 1 is a schematic view illustrating the apparatus of this invention in its preferred form wherein both a stretch indicating means and a torque indicating means are provided in the same apparatus.

In the drawings, the letter A designates generally the apparatus of this invention which is adapted to be positioned in a pipe P that has become stuck in a well bore W at a keyseat K or other similar restriction. Briefly, the apparatus A is adapted to be lowered into the stuck pipe P on a flexible non-electrical line L for the purpose of locating the free point of the pipe P. As will be explained more in detail hereinafter, the apparatus A is provided with means for indicating longitudinal stretch applied to the pipe P and is also capable of indicating rotational torque applied to the pipe P. Such apparatus A is operated by the wire line L so as to obtain such indications of longitudinal stretching and rotational torque by mechanical means.

Considering the invention more in detail, and referring in particular to FIGS. 2A through FIG. 6, one form of the apparatus A is adapted to be used for indicating only longitudinal stretch in the stuck pipe P. Such apparatus has a tubular body B which has an upper body section and a lower body section which are longitudinally movable relative to each other within limits. The upper body section has upper friction means or drag springs 10 mounted thereon. Such drag springs 10 are preferably of the bow type as illustrated in FIG. 2B and they are mounted so as to frictionally engage the inner wall or surface of the stuck pipe P. Various types of friction means such as the drag springs 10 may be employed. The springs 10 are of the resilient flexible metal type which exert a frictional outward force and which have their lower ends secured against movement by screws 10a threaded into a sleeve 12. The upper ends of the drag springs 10 are free to move and are urged resiliently outwardly by a coil spring 11.

The tubular element or member 12 has a coupling 14 threadedly connected thereto and to which a connector sleeve 15 is also attached by threads or other suitable means. The connector sleeve 15 has one or more laterally extending keys 15a formed thereon which fits into a slot or groove 16a of a connecting sleeve 16. The key 15a is limited in its longitudinal movement by the engagement with the lateral shoulder 16b in the upward direction and by the engagement with another lateral shoulder 17a on a connecting element 17 in the downward direction.

Figure 2A:
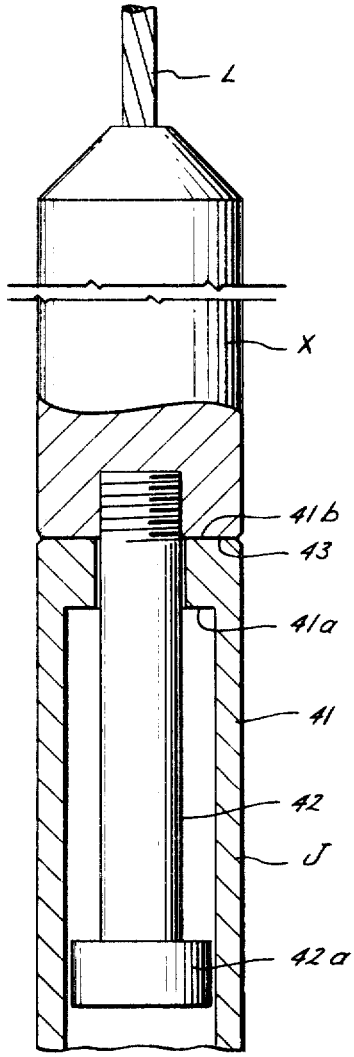
FIGS. 2A, 2B and 2C are views, partly in elevation and partly in section, illustrating the apparatus of this invention in one embodiment wherein only a stretch indicating means is provided.
Figure 2B:
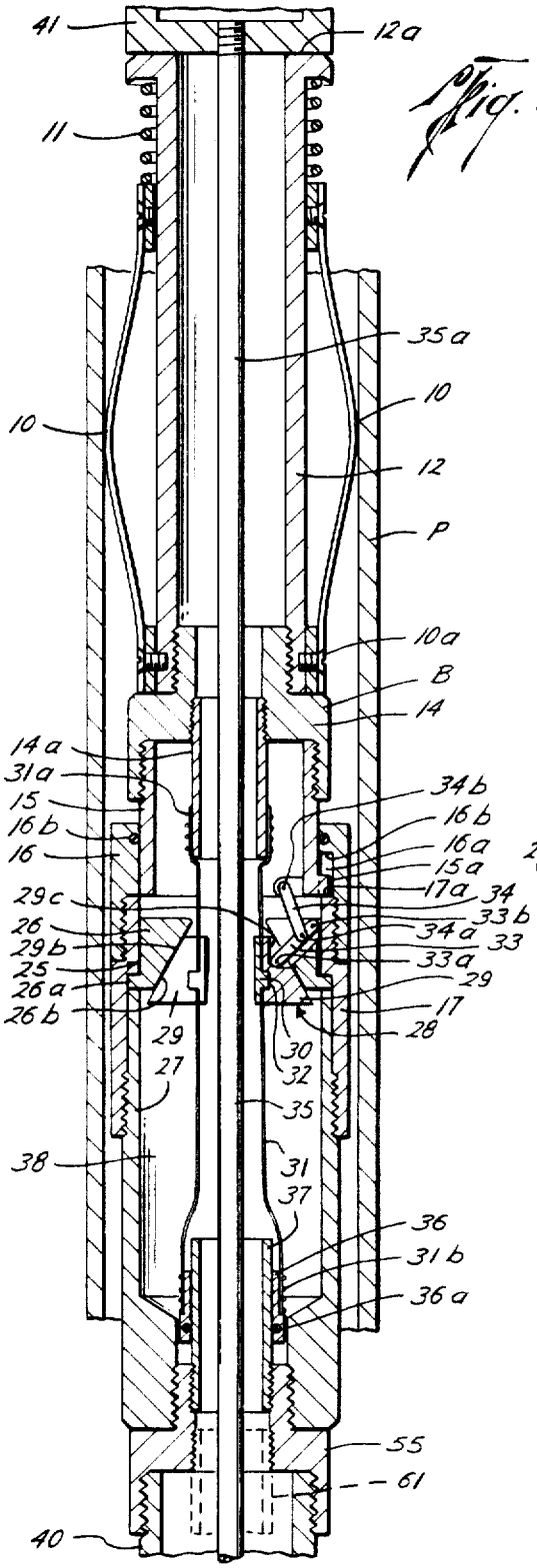

Thus, the upper body section shown in FIG. 2B includes the sleeve 12, the coupling member 14, and the connecting sleeve 15. The lower body section includes the connecting sleeve 16, the coupling element 17 and the other tubular elements forming the body extending therebelow down to the closure cap 18 at the lower end of the apparatus (FIG. 2C).

Figure 2C:
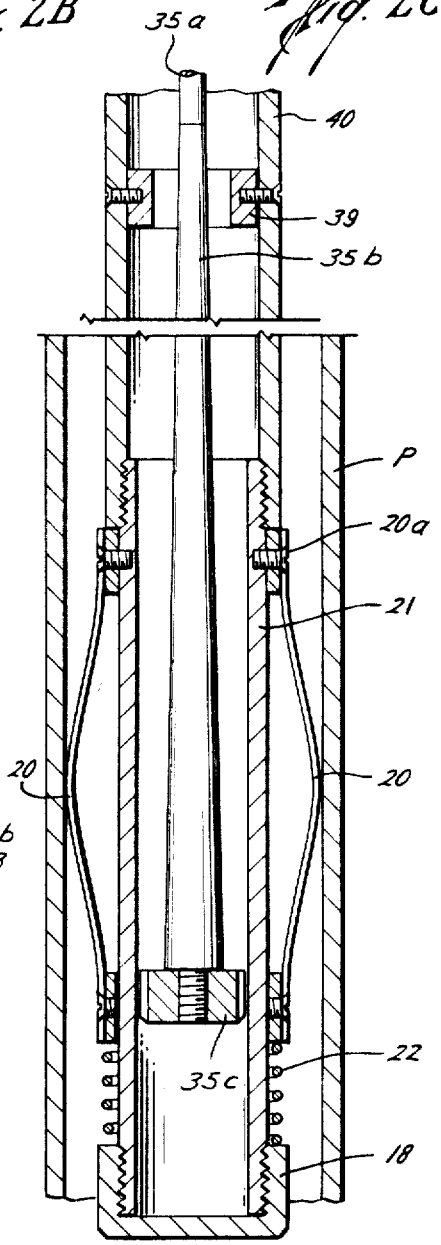

The lower body section carries a set of lower friction means or drag springs 20 which are usually identical with the friction means or drag spring 10 and therefore are shown in FIG. 2C as identical with the drag springs 10 shown in FIG. 2B except that the drag springs 20 are reversed. Thus, the upper ends of the drag springs 20 are secured to a lower sleeve 21 by attaching screws 20a or other suitable securing means, while the lower ends of the drag springs 20 are free to move longitudinally on the element 21 and are resiliently urged upwardly by a coil spring 22. Therefore, the drag springs 20 maintain a constant outward resilient frictional force on the inner surface or wall of the pipe P.

For sensing or detecting longitudinal stretch developed in the stuck pipe P, a sensing means or unit 25 is provided for coaction with a control rod 35, as will be explained. The sensing means 25 includes an annular actuating ring 26 which has an outwardly extending flange 26a secured between the end of a sleeve 27 and a shoulder on the sleeve 17 to firmly secure such actuating ring 26 in a fixed position on the lower body section. The ring 26 also preferably has a tapered inner surface 26b which serves as a guide surface as will be more evident hereinafter.

The sensing means 25 also includes a plurality of sensing dogs 28 which are formed in two portions designated 29 and 30. As shown in detail in FIG. 6, each of the sensing elements or dogs 30 is formed with a threaded stud 30a which is adapted to extend through a flexible relatively soft rubber boot or sleeve 31. The hole in the sleeve or boot is designated 31a. A retainer nut 32 having internal threads 32a is adapted to be threaded on the stud 30a to form a fluid-tight seal and to also provide a support for the sensing element 30 as it moves laterally with respect to the longitudinal axis of the apparatus A. Thus, the retainer nut 32 fits within a recess 29a in the element 29 so as to provide for the longitudinal movement of each element 30 with each element 29. The sensing elements 29 have inclined or tapered surfaces 29b which are in engagement with the inclined surface 26b of the ring 26. In order to provide for the longitudinal movements of the elements 30 and 29 to correspond proportionately with the inward and outward lateral movements thereof, it is desirable to have the inclined surfaces 26b and 29b formed at a forty-five degree angle as illustrated in FIG. 2B. Each of the wedge-shaped sensing elements 29 is also provided with a groove or recess 29c for receiving a pivoted link 33. Each of such links 33 is pivotally connected to one of the elements 29 at 33a and is also pivotally connected to the ring 26 at 33b (FIG. 2B). Each link 33 is movable within a slot 26c (FIG. 5) in the ring 26. Also, a second actuating link 34 is provided for connection to each link 33, with a pivotal connection therebetween being provided at 34a. The upper end of each link 34 is pivotally connected to the sleeve 15 at pivot 34b (FIG. 2B).

With such construction, upon an upward movement of the upper body section, including the tubular sleeve 15 so as to move the shoulder 15a upwardly with respect to the shoulder 16b, the links 34 cause an upward pivoting of the links 33 to slide the elements 29 upwardly with respect to the ring 26. Thus, the opening between the dogs or elements 30 is reduced to a smaller diameter, the purpose of which will be more evident hereinafter.

It is to be noted that the boot 31 is made of a rubber which is flexible and which has its upper end over a tube 14a and is held thereon by a wire or other wrapping 31a. The lower end of the boot 31 is preferably engaged on a sliding sleeve 36 which fits over a tube 37 and is sealed off with an O-ring 36a. The upper end of the chamber 38 is sealed off with an O-ring 16b. The lower end of the boot 31 is secured to the sliding sleeve 36 by a wire or other retaining element 31b. With the boot 31 in position as illustrated in FIG. 2B, a chamber 38 is provided which is sealed off from the well fluid in the pipe P. Such chamber 38 may have oil or other lubricating liquid to facilitate the working of the elements 29 with respect to the ring 26 and also the movement of the sleeve 15 with respect to the sleeve 16. The boot 31 is especially desirable in cases where the apparatus A is used in deep drilling jobs where mud and sand are present in the well and are circulated by the well fluid. However, in some instances, the boot 31 may be omitted and also the sensing plates or elements 30 may likewise be omitted.

The control rod 35 has its upper portion formed with a uniform or constant external diameter as indicated at 35a, but the lower end is tapered as indicated at 35b (FIG. 2C) so as to provide a lower section of different diameters for a purpose to be described hereinafter. A lower stop nut 35c is provided, preferably at the lower end of the control or measuring rod 35 for engagement with a stop ring 39 attached to a tubular element 40 forming a part of the lower body section.

The upper end of the control or measuring rod 35 is preferably attached to a conventional jar indicated at J in FIG. 2A. The upper end of the rod 35 is shown in FIG. 2B as threaded to the lower jar housing 41, which housing 41 rests upon a latter shoulder 12a of the tubular body section 12. A plurality of weights X may be used above the jar J to facilitate the lowering of the apparatus A into the pipe P, although both the jars J and the weights X may be omitted in many uses of the present apparatus A. As illustrated in FIG. 2A, the weights X may be moved upwardly relative to the jars J but such movement is limited by a stop member 42 which has a stop flange 42a on its lower end engageable with a lateral shoulder 41a. Upon a downward movement of the weights X, the lower surface 43 is adapted to contact the upper surface 41b to provide a jarring downward movement in situations where that becomes desirable or necessary for lowering the apparatus A in the pipe P. When the weight of the apparatus A by itself is sufficient to accomplish the lowering thereof into the pipe P, the weights X and the jar J may be omitted, in which case the wire L is connected directly to the upper end of the measuring rod 35 by any conventional connector.

The indicatings at the top of the well which are obtained by the apparatus A are obtained on conventional equipment which includes a weight indicator and an odometer, as will be more evident hereinafter. The odometer is a conventional device for indicating the amount or footage of the wire line L which has been lowered into the pipe P. The odometer normally has a contact wheel 50 (FIG. 1) which is moved by the movement of the wire line L, and such movements are shown on a dial or meter 51. Thus, by looking at the meter 51, the operator can readily determine the amount of the wire line L which has been lowered into the pipe P, and normally this appears in feet on such meter 51.

A weight indicator 52 is also schematically illustrated in FIG. 1 since it likewise is preferably of conventional construction.

In the use of the apparatus illustrated in FIGS. 2A–6, only longitudinal stretch readings can be obtained. To obtain such longitudinal stretch readings, the apparatus is usually first lowered into the pipe P to a depth at which it is believed the pipe P is free, although the first reading may be taken in a stuck portion of the pipe P, if desired. When the apparatus approaches a position in the pipe P for taking a reading, the weights X and jar J may be used to jar downwardly to be certain that the sleeve 15 is telescoped downwardly to the full extent within the sleeve 16 (FIG. 2B), whereby the bore of the sensing element 25 is in the fully opened position.

Then, the wire line L is raised upwardly until the full weight supported by the wire line L is indicated at 52a on the weight indicator. Such weight is known in advance by the operator. When the weight of the jar J, the weights X, the control rod 35 and the other parts directly supported by the wire line L is indicated at 52a on the weight indicator 52, the operator knows that readings of increased weight on the indicator 25 are indicative of strain on the line L. Therefore, the upward movement of the line is continued to move the lower stop 35c into engagement with the stop 39, and an additional strain is taken on the line L which is indicated at 52b on the weight indicator 52. At that point, the odometer 51 is read. Then, the wire line L is slacked off so as to allow the control or measuring rod 35 to move downwardly to position the tapered portion 35b below the sensing mechanism or unit 25. Normally, it is only necessary to slack off on the wire line L about ten feet in order to be certain that this condition exists. Then, a longitudinal pull is exerted on the pipe P at the surface in a predetermined amount. It is standard to apply about thirty-five thousand pounds pull on four and one-half inch pipe; other amounts of pull are used for other sizes of pipe.

Figure 3:
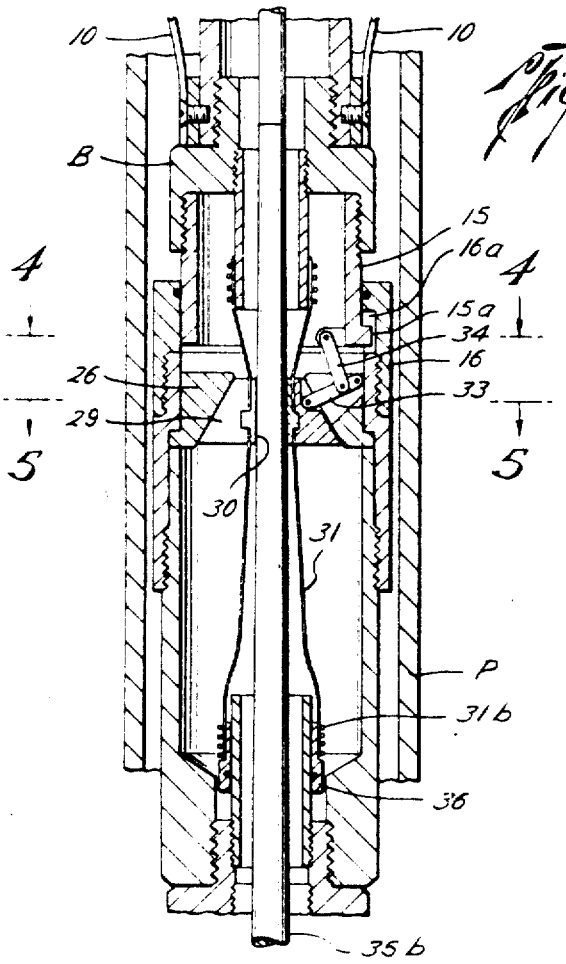
FIG. 3 is a view, partly in elevation and partly in section of a portion of the apparatus of FIG. 2B, but illustrating the apparatus in position for indicating a stretch in the pipe which is stuck in the well.
Figure 4:
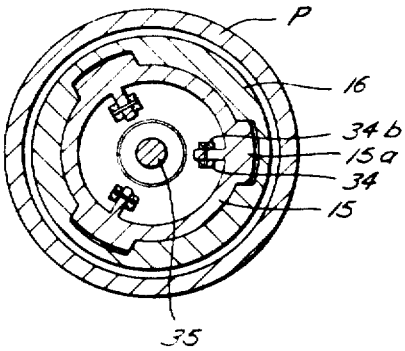
FIG. 4 is a horizontal cross-sectional view taken on line 4—4 of FIG. 3.
Figure 5:
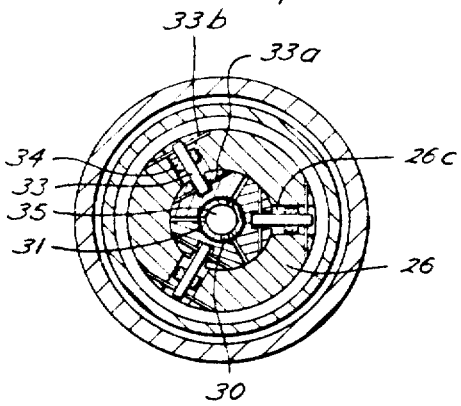
FIG. 5 is a horizontal sectional view taken on line 5—5 of FIG. 3.

While the pipe P is thus subjected to the longitudinal pull, the wire line L is again picked up until the weight indicator reads the same amount as indicated at 52b. At that point, the odometer 51 is again read. If the pipe is free between the friction members 10 and 20, the stretch in the pipe P will have caused the upper body section and the friction means 10 to have moved upwardly relative to the lower body section and the lower friction means 20 thereby causing the sleeve 15 to have moved upwardly relative to the sleeve 16. Such stretch position is illustrated in FIG. 3, and there it can be seen that the sensing elements 29 and 30 have also moved inwardly to provide a reduced diameter or opening as compared to the opened position of FIG. 2B. By reason of such reduced opening or diameter, the tapered rod portion 35b cannot move for the full distance prior to the stretching of the pipe and therefore the upward travel of the rod 35 is stopped before the stop member 35c engages the stop 39. Thus, when the apparatus A of the form shown in FIGS. 2A through 6 is in a free portion of the pipe P, the odometer 51 will show that a greater length of wire line L is suspended in the well than on the first reading when the sensing means 25 was open. If, on the other hand, the apparatus A is entirely within the stuck portion of the pipe, the reading on the odometer 51 will show no change from the first reading since the pipe P will not have been stretched in the stuck portion and therefore the sensing means 25 will have remained open even after the stretch or pull has been applied to the pipe P, thereby allowing the rod 35 to move all the way to the upper end of its stroke with the stop member 35c in contact with the stop 39. In some instances, the pipe P is only partially stuck and therefore an intermediate reading or readings will be obtained.

Normally, in using the apparatus A, the apparatus is lowered so that it can be checked in the free portion of the pipe for several readings to obtain an average reading and then the apparatus A is dropped down perhaps three hundred feet or more to be certain that the apparatus is then in a stuck portion of the pipe. Then the apparatus can be raised upwardly and successive readings may be taken until the free point of the pipe above the stuck point is located as accurately as possible.

Figure 7:
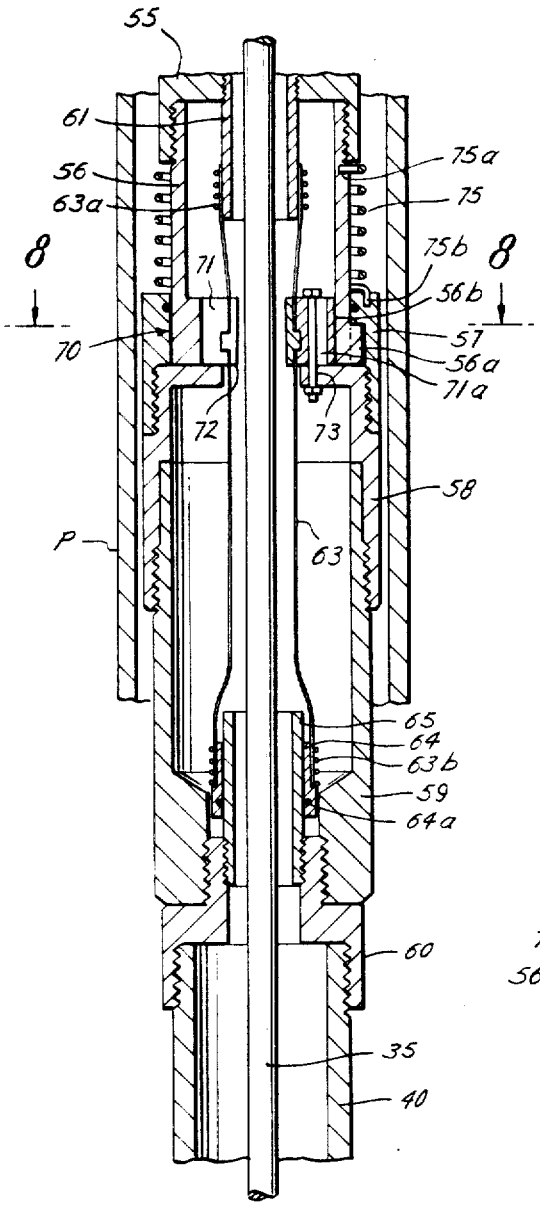
FIG. 7 is a view, partly in elevation and partly in section, illustrating a portion of the apparatus of this invention for indicating torque developed in a stuck pipe.
Figure 8:
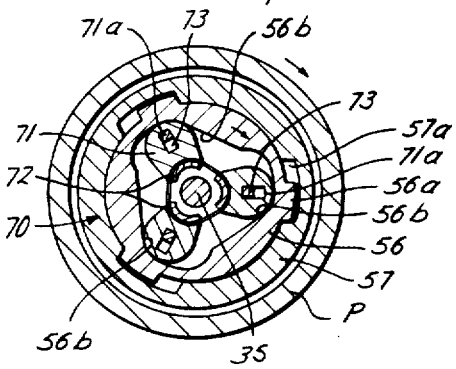
FIG. 8 is a horizontal sectional view taken on line 8—8 of FIG. 7 and illustrating the torque unit with the sensing means in an open position.
Figure 9:
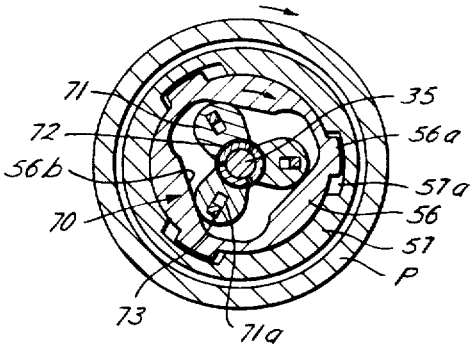
FIG. 9 is a view similar to FIG. 8, but illustrating the torque sensing means in the closed position.

In FIGS. 7–9, a torque sensing section or assembly is illustrated, which may be substituted for the stretch sensing mechanism or unit 25 of FIG. 2B, or in some cases, the section shown in FIGS. 7–9 may be included as a part of the tool illustrated in FIGS. 2B and 2C.

When the torque section of FIGS. 7–9 is included with the apparatus A, the coupling section 55 (FIGS. 2B and 7) is threaded to a rotatable sleeve 56 rather than to the tubular section 40. Such coupling section 56 is mounted for limited rotational movement within a connector sleeve 57 which is in turn connected to threaded tubular sections 58, 59 and 60. The element 60 corresponds in size and shape in the preferred form of the invention with the coupling element 55 so that it may be connected to the tube 40, thereby joining the assembly of FIG. 7 to the assembly of FIG. 2C therebelow. The rod 35 is thus elongated to extend through the torque section shown in FIG. 7, thereby forming a part of the rod 35 shown in FIGS. 2B and 2C. In FIG. 2B, a connector tube 61 is shown in dotted lines since such tube 61 is not used except when the torque section of FIG. 7 is included as a part of the apparatus A. In FIG. 7, such tube 61 is shown in solid lines, and therefore the connection between the portion shown in FIG. 2B and the portion shown in FIG. 7 can be readily seen. A flexible boot or tube 63 formed of rubber or other resilient material is disposed with its upper end stretched over the tube 61 and held there by a wire wrapping or similar holding means 63a. The lower end of the flexible tube 63 is secured to a sliding sleeve 64 by means of wire wrapping 63b or other similar securing means. The sliding sleeve 64 is similar to the sliding sleeve 36, and it is adapted to longitudinally slide on a tube 65 threaded or otherwise connected in the bore of the coupling 60 (FIG. 7). An O-ring seal 64a is carried by the sliding sleeve 64.

A torque sensing unit 70 is provided in the torque section of FIGS. 7–9, and it includes the rotatable sleeve 56 which has one or more keys or stops 56a formed thereon for limited rotational movement within slots 57a in the connector sleeve 57. Within the lower portion of the sleeve 56 there are three sensing elements 71 which are adapted to be moved radially by coaction with a cam surface 56b.

Figure 6:
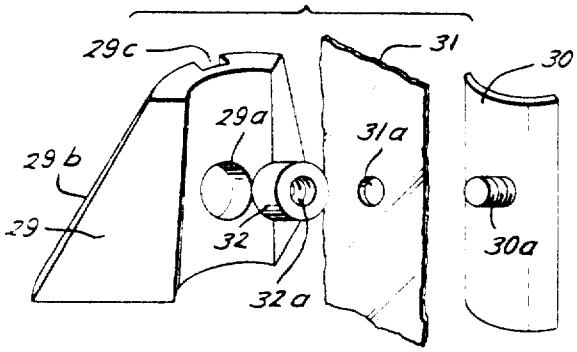
FIG. 6 is an exploded view illustrating the preferred manner of constructing the sensing means of the apparatus of this invention.

When the boot 63 is employed, the sensing element 71 may have surface plates 72 disposed inwardly of the boot 63 and connected thereto in the same manner as illustrated in connection with FIG. 6 of the drawings so that the inner dogs or elements 72 move together with the elements 71 and in reality are a part thereof when the boot 63 is employed. When the boot 63 is omitted, the elements 72 may be likewise omitted.

The elements 71 are guided for radial movement by pins 73 which preferably have a square cross section and which fit into slots 71a. The dogs 71 are moved inwardly by coaction with the cam surfaces 56b as such cam surfaces 56b move counterclockwise from the position shown in FIG. 8 to the position shown in FIG. 9.

Although not essential, it is desirable to provide a spring 75 which has its upper end 75a secured to the sleeve 56 and its lower end 75b secured to the sleeve 57 for exerting a rotational force on the sleeve 56 to maintain the dogs 71 and the elements 72 therewith in the closed position of FIG. 9 except when taking a reading, as will be explained.

Considering now the operation of the torque section of the apparatus A and assuming that it is mounted in the tool as heretofore described and as schematically illustrated in FIG. 1, the apparatus A is first disposed in the pipe P prior to taking any stretch or applying any rotational or torque to the pipe P. The wire line L is pulled upwardly until the indicator 52 again indicates the total weight suspended by the wire line L such as indicated at 52a. The line L is thereafter moved upwardly after the weight is indicated at 52a until an additional amount of strain or weight is indicated on the weight indicator 52 such as at 52b. Since the torque sensing elements 71 and 72 are in their closed position, the additional weight will be indicated at 52b almost immediately upon the entry of the tapered section 35b into the bore of the sensing unit 70. Therefore, as soon as such additional weight is indicated, the lifting with the line L is stopped and a reading on the odometer 51 is taken.

The line L is then slacked off only enough to relieve the strain and return the weight indicator reading to 52a. A rotational or torque force is then applied to the pipe P at the surface of the well in a prescribed amount, which normally would be about one round per one thousand feet of estimated free pipe. Such rotation or torque force is applied in a clockwise direction as viewed from the top of the well and as seen in FIGS. 8 and 9. The twisting of the pipe P imparts a turning movement to the free portion of the pipe P and therefore so long as the upper drag springs 10 are in a free portion of the pipe, there will be a relative movement of the upper drag springs 10 with respect to the lower drag springs 20. Such relative movement causes a corresponding clockwise movement (as viewed in FIG. 9) of the sleeve or tube 56 so as to allow the elements 71 to open to provide a larger bore within the sensing means 70. It is to be noted that the cam surface 56b is at such an angle in the preferred form of the invention to provide for the same unit of radial movement outwardly for the elements 71 for each unit of rotation of the sleeve 56. Such cam surface 56b will therefore approximate a forty-five degree angle, but allowance must be made for the rotational movement of the sleeve 56 relative to the elements 71. Thus, assuming that a change in rotational movement of the sleeve 56 is one hundredth of an inch, likewise the diameter of the bore between the elements 72 would change by one hundredth of an inch, and such unit change is the same for each unit of rotation of the element 56 in the preferred form of the invention. In that way, the extent of the opening of the bore of the sensing element 70 will correspond with the amount of torque in the pipe P and such amount will be reflected by the length of the tapered portion 35b of the control rod 35 which is able to move into such bore of the sensing means 70 as will be more evident.

Thus, with the sensing element 70 in a partially opened position, or even a fully opened position, by reason of the torque force, put into the pipe P, such rotational torque can be determined by again raising the wire line L until the weight indicator again reads the amount indicated at 52b. If the apparatus A is in a free portion of the pipe P, or at least the upper drag springs 10 are in such free portion, the elements or dogs 71 and 72 will be open to some extent as compared to the closed position of FIG. 9 and therefore the odometer will read a lesser amount than when the dogs 71 and 72 were in the closed position of FIG. 9. The extent of the opening will be indicated by such reading on the odometer 51.

If both of the springs 10 and 20 are in the stuck portion of the pipe P, then upon pulling upwardly on the wire line L and picking up on such line L until the load is the same as previously indicated at 52b on the weight indicator 52, the operator will know that the apparatus A is in the stuck portion of the pipe because no change will occur in the odometer reading. By selecting intermediate readings between the stuck pipe readings and the free pipe readings, the free point of the pipe may be located as closely as possible.

When the torque section of FIGS. 7–9 is incorporated as a part of the apparatus A as indicated in FIG. 1, the torque reading may be obtained first as pointed out above and then when it is desired to take a stretch reading, the torque section may be completely opened so that it will not interfere with the taking of the stretch reading. The opening of the torque section is accomplished by pulling upwardly on the wire line L until the full taper of the tapered portion 35b has moved upwardly and the stop nut 35c has contacted the stop 39. In such case, the dogs 71 and 72 are moved outwardly to the position shown in FIG. 8 and during such movement, the spring 75 is stressed so that relative movement of the sleeves 56 and 57 is obtained. The upper drag springs 10 are turned clockwise (as viewed in FIG. 9) and/or the drag springs 20 are turned counterclockwise providing some longitudinal movement of the entire apparatus is also obtained to relieve the frictional engagement of the springs 10 and 20 in the pipe P. The dogs 71 and 72 are held in such outward position by the friction of the springs 10 and 20 after such longitudinal movement of the entire tool is stopped. The operator at the surface of the well can tell that such condition has been obtained by the amount of travel of the line L as shown on the odometer 51 with the full weight of the apparatus supported on the wire line L. Normally, as the tapered surface 35b first engages the dogs 72, the full weight of the apparatus is supported on the line L, but as the dogs 71 and 72 start to open, then the weight on the line L drops since only the control rod 35, the weights X, the jar J and the parts directly on the line L are then supported thereby. When the stop nut 35c engages the stop 39, the full weight of the apparatus will again be on the wire line L and if the odometer reading indicates that the line L has moved upwardly a sufficient distance to enable the stop nut 35c to have reached the stop 39, the operator knows the dogs 71 and 72 are fully open. After the torque section 70 is in such maximum opened position, the wire line L may be lowered and the torque section 70 will stay in such opened position. Then, the stretch section can be used by taking a stretch in the pipe P as previously explained, followed by a lifting of the wire line L to again assume the load indicated at 52b and by taking a measurement to indicate the extent to which the tapered portion 35b has passed into the bore of the sensing means 25.

The stretch reading may be taken first by following the procedure of opening the torque means 70 if desired since the torque means 70 actually does not interfere with the taking of the stretch readings once it has been fully opened. To return the torque sensing means 72 to its closed position for performing the torque test, a simple jar or downward movement of the apparatus A will be sufficient to release the frictional force exerted by the drag springs 10 and will allow the tension spring 75 to return the torque sensing means 72 to the closed position of FIG. 9. Once the torque sensing means is in the position shown in FIG. 9 the steps described above for obtaining a reading on the torque sensing means 70 may be followed.

It should be pointed out that the tool of this invention as disclosed herein may be operated upside down in which case the readings on the odometer 51 will be taken by slacking off on the wire line rather than when pulling on such wire line L. It is therefore to be understood that the use of the apparatus A in an upside down position with the wire line L connected to the lower end of the control rod 35 is within the scope of this invention.

The foregoing disclosure and description of the inventin is illustrative and explanatory thereof and various changes in the size, shape and materials, as well as in the details of the illustrated construction, may be made within the scope of the appended claims without departing from the spirit of the invention.

What is claimed is:

1. Free point indicator apparatus, comprising:

(a) a tubular body adapted to be lowered into the bore of a pipe which is stuck in a well, (b) a flexible non-electrical line connected to said tubular body for lowering the body into the stuck pipe, (c) said body having an upper body section and a lower body section with means for permitting limited relative longitudinal movement therebetween, (d) an upper friction means on said upper body section for frictionally engaging the stuck pipe, (e) a lower friction means on said lower body section for frictionally engaging the stuck pipe, (f) sensing means operable in response to longitudinal movement of a free or partially free portion of the stuck pipe, and (g) a control rod operably connected to the flexible non-electrical line for controlling the amount of movement of said line different distances depending upon the amount of movement in the pipe by coaction of the control rod with said sensing means to thereby obtain an indication on the amount of movement of the free or partially free portion of the stuck pipe.

2. Free point indicator apparatus, comprising:

(a) a tubular body adapted to be lowered into the bore of a pipe which is stuck in a well, (b) a flexible non-electrical line connected to said tubular body for lowering the body into the stuck pipe, (c) said body having an upper body section and a lower body section with means for permitting limited relative longitudinal movement therebetween,
(d) an upper friction means on said upper body section for frictionally engaging the stuck pipe,
(e) a lower friction means on said lower body section for frictionally engaging the stuck pipe,
(f) a variable bore sensing means operable to vary the size of the bore in response to longitudinal movement of a free or partially free portion of the stuck pipe, and
(g) a control rod longitudinally movable in the bore of the sensing means for different distances depending upon the size of the variable bore to thereby indicate variations in the longitudinal movement of the free portion of the pipe.

3. Free point indicator apparatus, comprising:
(a) a tubular body adapted to be lowered into the bore of a pipe which is stuck in a well,
(b) a flexible non-electrical line connected to said tubular body for lowering the body into the stuck pipe,
(c) said body having an upper body section and a lower body section with means for permitting limited relative longitudinal movement therebetween,
(d) an upper friction means on said upper body section for frictionally engaging the stuck pipe,
(e) a lower friction means on said lower body section for frictionally engaging the stuck pipe,
(f) a variable bore sensing means operable to vary the size of the bore in response to longitudinal stretching of the stuck pipe, and
(g) a control rod having sections of different diameters and longitudinally movable in the bore of the sensing means until the diameter of the control rod within the bore of sensing means corresponds with the diameter of the bore to thereby indicate the amount of stretch in the stuck pipe.

4. Free point indicator apparatus, comprising:
(a) a tubular body adapted to be lowered into the bore of a pipe which is stuck in a well,
(b) a flexible non-electrical line connected to said tubular body for lowering the body into the stuck pipe,
(c) said body having an upper body section and a lower body section with means for permitting limited relative longitudinal movement therebetween,
(d) an upper friction means on said upper body section for frictionally engaging the stuck pipe,
(e) a lower friction means on said lower body section for frictionally engaging the stuck pipe,
(f) a variable bore sensing means operable to vary the size of the bore in response to longitudinal stretching of the stuck pipe, and
(g) a control rod having a tapered section and longitudinally movable in the bore of the sensing means to position same in contact with such bore for indicating the stretch in the stuck pipe by the amount of movement of the control rod before it reaches such contact.

5. Free point indicator apparatus, comprising:
(a) a tubular body adapted to be lowered into the bore of a pipe which is stuck in a well,
(b) a flexible non-electrical line connected to said tubular body for lowering the body into the stuck pipe,
(c) said body having an upper body section and a lower body section with means for permitting limited relative longitudinal movement therebetween,
(d) an upper friction means on said upper body section for frictionally engaging the stuck pipe,
(e) a lower friction means on said lower body section for frictionally engaging the stuck pipe,
(f) sensing means having a variable sized opening which is operable to vary the size of such opening in response to longitudinal movement of the upper and lower body sections relative to each other, and
(g) a control rod extending through said opening of the sensing means and operably connected to said flexible non-electrical line for movement relative to said sensing means different distances depending upon the size of the variable opening in said sensing means for thereby indicating whether the apparatus is in a free or partially free portion of the stuck pipe.

6. Free point indicator apparatus, comprising:
(a) a tubular body adapted to be lowered into the bore of a pipe which is stuck in a well,
(b) a flexible non-electrical line connected to said tubular body for lowering the body into the stuck pipe,
(c) said body having an upper body section and a lower body section with means for permitting the limited relative [longitudinal] *rotational* movement therebetween,
(d) an upper friction means on said upper body section for frictionally engaging the stuck pipe,
(e) a lower friction means on said lower body section for frictionally engaging the stuck pipe,
(f) sensing means having a variable sized opening which is operable to vary the size of such opening in response to torque forces developed in the stuck pipe between the upper and lower friction means, and
(g) a control rod extending through said opening of the sensing means and operably connected to said flexible non-electrical line for movement relative to said sensing means different distances depending upon the size of the variable opening in said sensing means for thereby indicating whether the apparatus is in a free or partially free portion of the stuck pipe.

7. Free point indicator apparatus, comprising:
(a) a tubular body adapted to be lowered into the bore of a pipe which is stuck in a well,
(b) a flexible non-electrical line connected to said tubular body for lowering the body into the stuck pipe,
(c) said body having an upper body section and a lower body section with means for permitting limited relative [longitudinal] *rotational* movement therebetween,
(d) an upper friction means on said upper body section for frictionally engaging the stuck pipe,
(e) a lower friction means on said lower body section for frictionally engaging the stuck pipe,
(f) sensing means having a variable sized opening which is operable to vary the size of such opening in response to rotational movement of the upper and lower body sections relative to each other, and
(g) a control rod extending through said opening of the sensing means and operably connected to said flexible non-electrical line for movement relative to said sensing means different distances depending upon the size of the variable opening in said sensing means for thereby indicating whether the apparatus is in a free or partially free portion of the stuck pipe.

8. Free point indicator apparatus, comprising:
(a) a tubular body adapted to be lowered into the bore of a pipe which is stuck in a well,
(b) a flexible non-electrical line connected to said tubular body for lowering the body into the stuck pipe,
(c) said body having an upper body section and a lower body section with means for permitting limited relative [longitudinal] *rotational* movement therebetween,
(d) an upper friction means on said upper body section for frictionally engaging the stuck pipe,
(e) a lower friction means on said lower body section for frictionally engaging the stuck pipe,
(f) a variable bore sensing means operable to vary the size of the bore in response to torque developed in the pipe between the upper and lower friction means, and
(g) a control rod longitudinally movable in the bore of the sensing means for different distances depending upon the size of the variable bore to thereby indicate variations in the torque developed in the pipe between the upper and lower friction means.

9. Free point indicator apparatus, comprising:

(a) a tubular body adapted to be lowered into the bore of a pipe which is stuck in a well, (b) a flexible non-electrical line connected to said tubular body for lowering the body into the stuck pipe, (c) said body having an upper body section and a lower body section with means for permitting limited relative [longitudinal] *rotational* movement therebetween, (d) an upper friction means on said upper body section for frictionally engaging the stuck pipe, (e) a lower friction means on said lower body section for frictionally engaging the stuck pipe, (f) a variable bore sensing means operable to vary the size of the bore in response to torque developed in the pipe between the upper and lower friction means, and (g) a control rod having sections of different diameters and longitudinally movable in the bore of the sensing means until the diameter of the control rod within the bore of the sensing means corresponds with the diameter of the bore to thereby indicate the amount of torque developed in the pipe between the upper and lower friction means.

10. Free point indicator apparatus, comprising:

(a) a tubular body adapted to be lowered into the bore of a pipe which is stuck in a well, (b) a flexible non-electrical line connected to said tubular body for lowering the body into the stuck pipe, (c) said body having an upper body section and a lower body section with means for permitting limited relative [longitudinal] *rotational* movement therebetween, (d) an upper friction means on said upper body section for frictionally engaging the stuck pipe, (e) a lower friction means on said lower body section for frictionally engaging the stuck pipe, (f) a variable bore sensing means operable to vary the size of the bore in response to torque developed in the pipe between the upper and lower friction means, and (g) a control rod having a tapered section and longitudinally movable in the bore of the sensing means to position same in contact with such bore for indicating the torque developed in the pipe between the upper and lower friction means.

References Cited

The following references, cited by the Examiner, are of record in the patented file of this patent or the original patent.

UNITED STATES PATENTS

| | | | |
|---|---|---|---|
| 2,340,609 | 2/1944 | Mestas. | |
| 3,095,736 | 7/1963 | Rogers | 73—151 |

RICHARD C. QUEISSER, *Primary Examiner.*

J. W. MYRACLE, *Assistant Examiner.*